(12) United States Patent
Liu et al.

(10) Patent No.: US 12,152,925 B2
(45) Date of Patent: Nov. 26, 2024

(54) OPTICAL DETECTION DEVICE

(71) Applicant: PixArt Imaging Inc., Hsin-Chu (TW)

(72) Inventors: Feng-Chi Liu, Hsin-Chu (TW);
Chi-Chieh Liao, Hsin-Chu (TW);
Guo-Zhen Wang, Hsin-Chu (TW);
Hung-Ching Lai, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/508,265

(22) Filed: Nov. 14, 2023

(65) Prior Publication Data
US 2024/0077350 A1    Mar. 7, 2024

Related U.S. Application Data

(62) Division of application No. 17/071,986, filed on Oct. 15, 2020, now Pat. No. 11,852,519.

(51) Int. Cl.
*G01F 23/292* (2006.01)
*G01F 23/80* (2022.01)

(52) U.S. Cl.
CPC .......... *G01F 23/2928* (2013.01); *G01F 23/80* (2022.01)

(58) Field of Classification Search
CPC .......................... B67D 1/1238; G01F 23/2928
See application file for complete search history.

(56) References Cited

U.S. PATENT DOCUMENTS 6,903,814 B1    6/2005    Juvinall
2017/0332871 A1*  11/2017  Sung ...................... G01S 17/46

* cited by examiner

*Primary Examiner* — Thanh Luu
(74) *Attorney, Agent, or Firm* — Winston Hsu (57) ABSTRACT

An optical detection device includes a first linear light source, a second linear light source, an optical sensor array and a processor. The first linear light source is adapted to project a first long strip illumination beam onto the target container. The second linear light source is adapted to project a second long strip illumination beam onto the target container, and the second long strip illumination beam is crossed with the first long strip illumination beam. The optical sensor array is adapted to receive a first long strip detection beam and a second long strip detection beam reflected from the target container. The processor is electrically connected to the optical sensor array. The processor is adapted to analyze intensity distribution of the first long strip detection beam and the second long strip detection beam to acquire a relative distance between the optical sensor array and the target container.

3 Claims, 12 Drawing Sheets

OPTICAL DETECTION DEVICE

CROSS REFERENCE TO RELATED APPLICATIONS

This application is a division of U.S. application Ser. No. 17/071,986, filed on Oct. 15, 2020. The content of the application is incorporated herein by reference.

BACKGROUND OF THE INVENTION

1. Field of the Invention

The present invention relates to an optical detection device, and more particularly, to an optical detection device of detecting a target container.

2. Description of the Prior Art

The conventional water dispenser cannot detect an elevation of water surface in the container. The user watches the container and controls the button of water dispenser to prevent the water from leakage. The conventional coffee mater may be able to detect whether the container is put in the right position via the proximity sensor or the ultrasonic sensor; however, the proximity sensor and the ultrasonic sensor cannot detect volume of the container and the liquid surface in the container. Thus, design of a liquid detection device of detecting the volume of the container and the liquid surface in the container via the optical detection technique for increasing functions of the water dispenser and the coffee maker is an important issue of the related industry.

SUMMARY OF THE INVENTION

The present invention provides an optical detection device of detecting a target container for solving above drawbacks.

According to the claimed invention, an optical detection device of detecting a target container is disclosed. The optical detection device includes a first linear light source, a second linear light source, an optical sensor array and a processor. The first linear light source is adapted to project a first long strip illumination beam onto the target container. The second linear light source is adapted to project a second long strip illumination beam onto the target container, and the second long strip illumination beam is crossed with the first long strip illumination beam. The optical sensor array is adapted to receive a first long strip detection beam and a second long strip detection beam reflected from the target container. The processor is electrically connected to the optical sensor array. The processor is adapted to analyze intensity distribution of the first long strip detection beam and the second long strip detection beam to acquire a relative distance between the optical sensor array and the target container.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
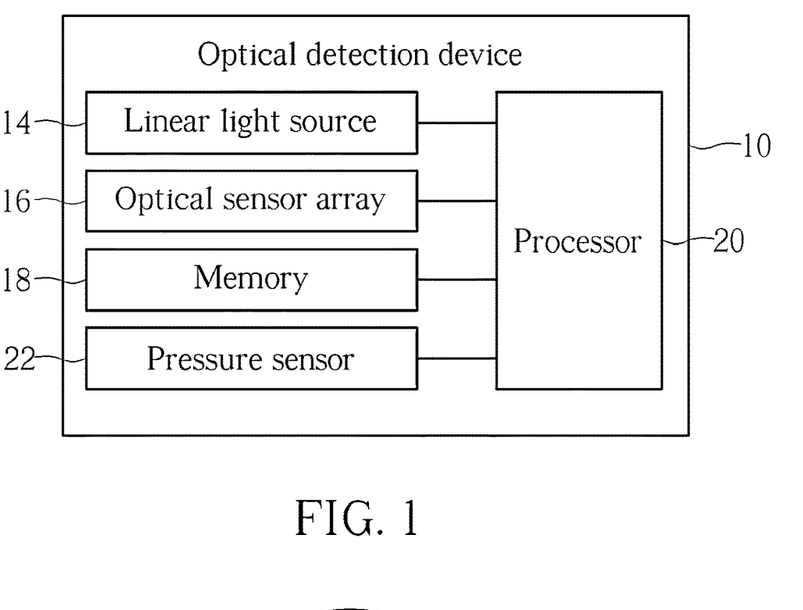
FIG. 1 is a functional block diagram of an optical detection device according to an embodiment of the present invention.
Figure 2:
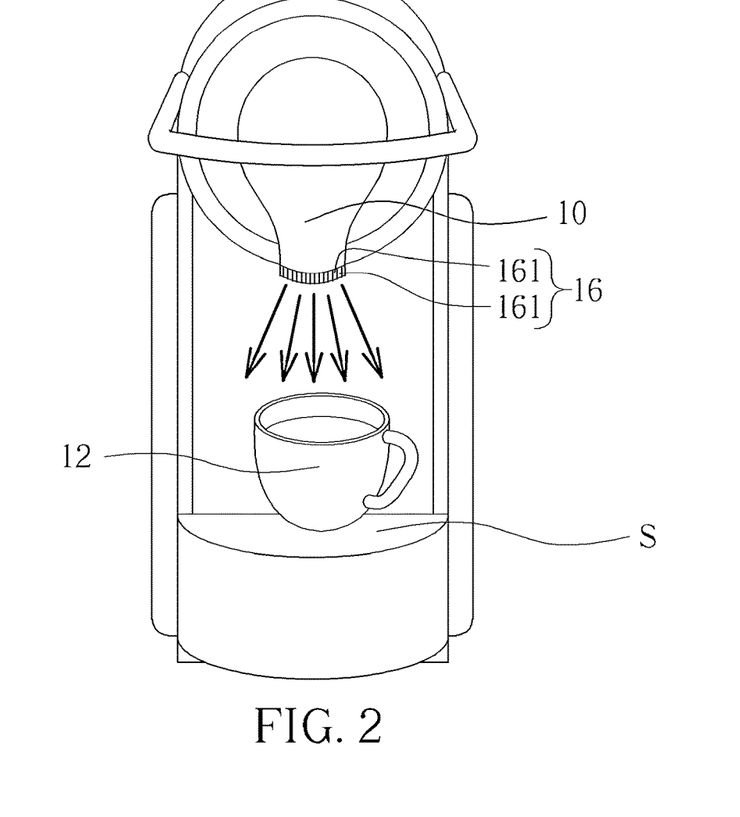
FIG. 2 is a schematic diagram of the optical detection device according to the embodiment of the present invention.

Please refer to FIG. 1 and FIG. 2. FIG. 1 is a functional block diagram of an optical detection device 10 according to an embodiment of the present invention. FIG. 2 is a schematic diagram of the optical detection device 10 according to the embodiment of the present invention. The optical detection device 10 can be applied to a water dispenser or a coffee maker. The optical detection device 10 can detect not only existence of a target container 12, but also a size of the target container 12 and a height of injected liquid matter in the target container 12. The optical detection device 10 can include a linear light source 14, an optical sensor array 16, a memory 18 and a processor 20. The linear light source 14, the optical sensor array 16 and the memory 18 can be electrically connected to the processor 20. The memory 18 can be an optional unit in the optical detection device 10.

Figure 3:
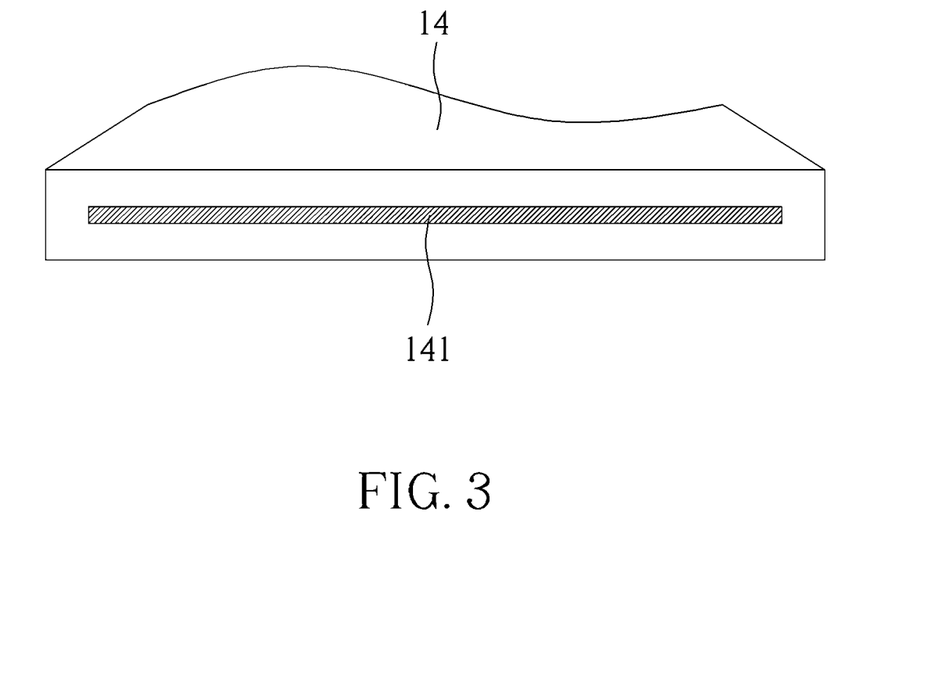
FIG. 3 and FIG. 4 are diagrams of a linear light source according to different embodiments of the present invention.
Figure 4:
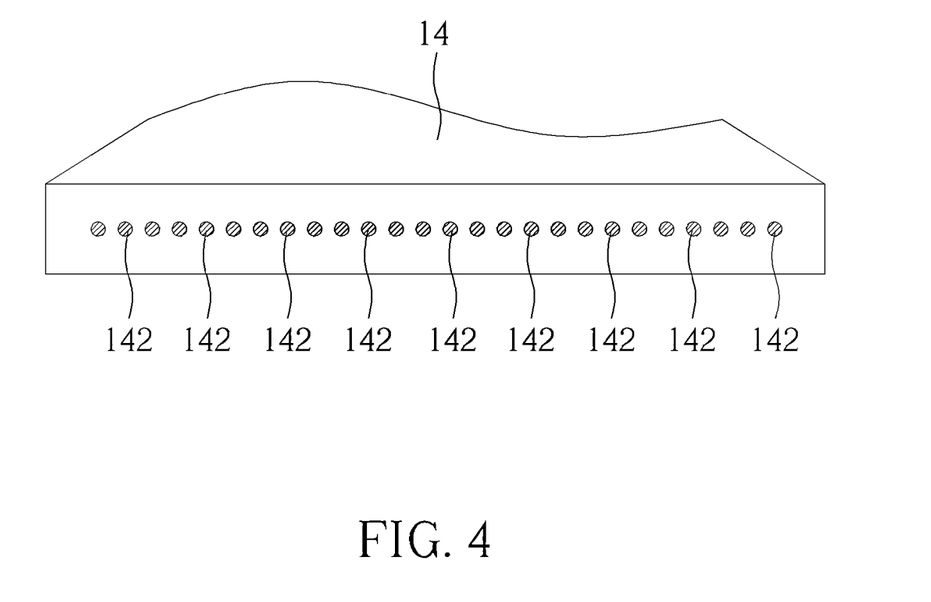

Please refer to FIG. 3 and FIG. 4. FIG. 3 and FIG. 4 are diagrams of the linear light source 14 according to different embodiments of the present invention. As shown in FIG. 3, the linear light source 14 can include one strip-formed lighting unit 141 used to generate and project a long strip illumination beam onto the target container 12. As shown in FIG. 4, the linear light source 14 can include a plurality of lighting units 142 arranged side by side, and the plurality of lighting units 142 respectively emit a small size beam to form the long strip illumination beam projected onto the target container 12. A length of the long strip illumination beam can be preferably greater than a size of the target container 12, which means the long strip illumination beam can be projected onto the target container 12 and a plane S whereon the target container 12 is located simultaneously.

The optical sensor array 16 can include a plurality of sensing units 161 arranged as a long strip for receiving a long strip detection beam. The optical sensor array 16 may be a M×1 matrix to match with a shape of the long strip detection beam, and M is a positive integer numeral; further, the optical sensor array 16 may be a M×N matrix, and M and N are positive integer numerals. An amount of the sensing units 161 depends on a detection area on the plane S for the target container 12, which means the amount of the sensing units 161 is increased in response to a size of the detection area, so as to broaden detection ability of the optical sensor array 16. The optical sensor array 16 can receive the long strip detection beam reflected from the target container 12 in response to projection of the long strip illumination beam. The processor 20 can analyze intensity distribution generated by the plurality of sensing units 161 to acquire a relative distance between the optical sensor array 16 and the target container 12. The relative distance can be transformed into the size of the target container 12, and the height of the injected liquid matter in the target container 12.

Figure 5:
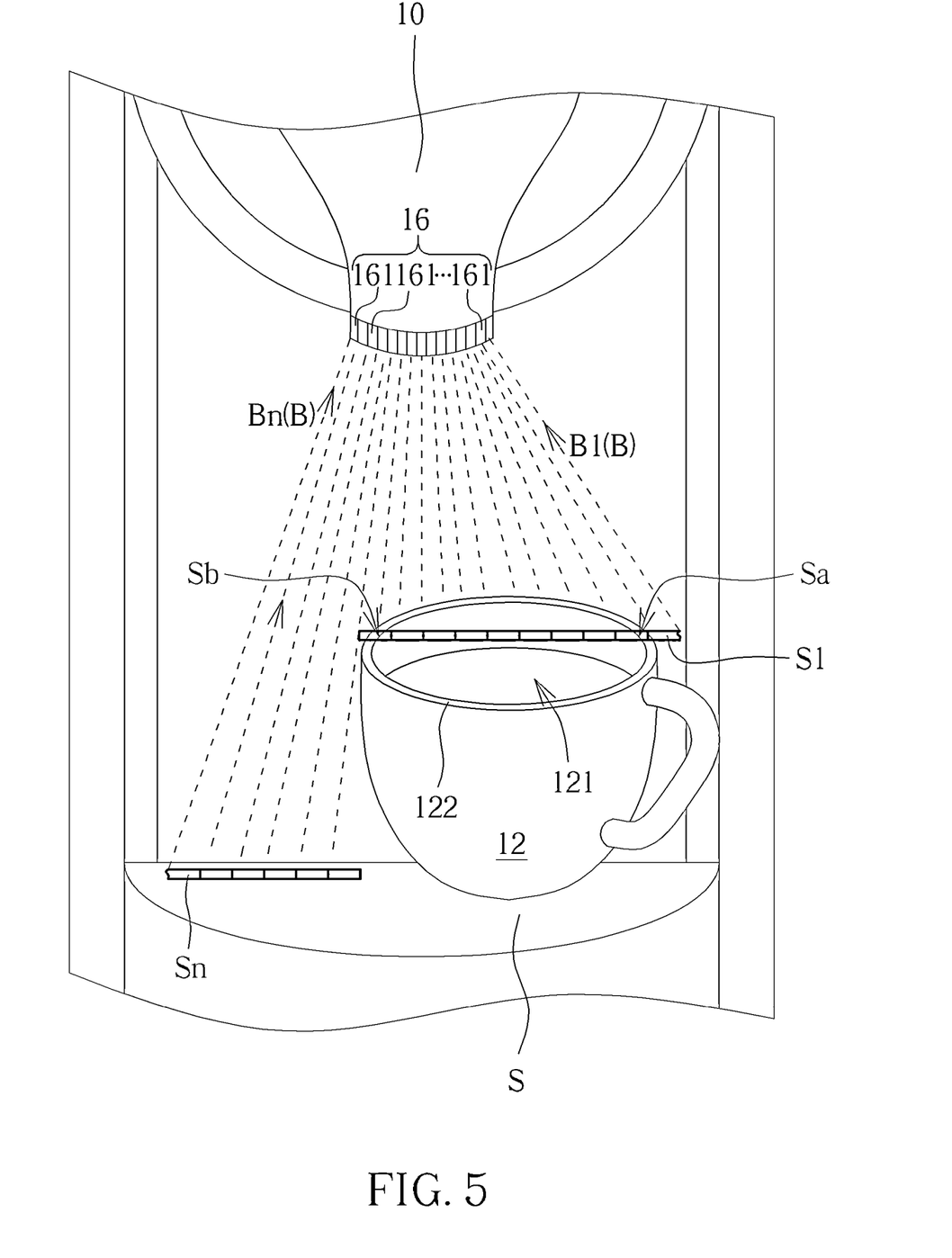
FIG. 5 is an enlarged diagram of a part of the optical detection device and a target container according to the embodiment of the present invention.
Figure 6:
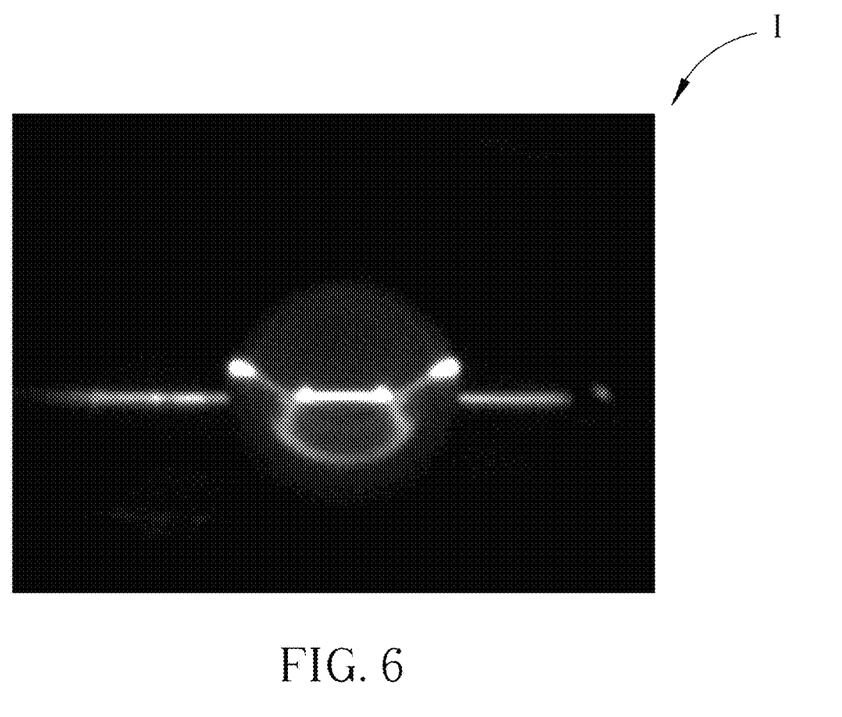
FIG. 6 is a diagram of an image captured by an optical sensor array according to the embodiment of the present invention.
Figure 7:
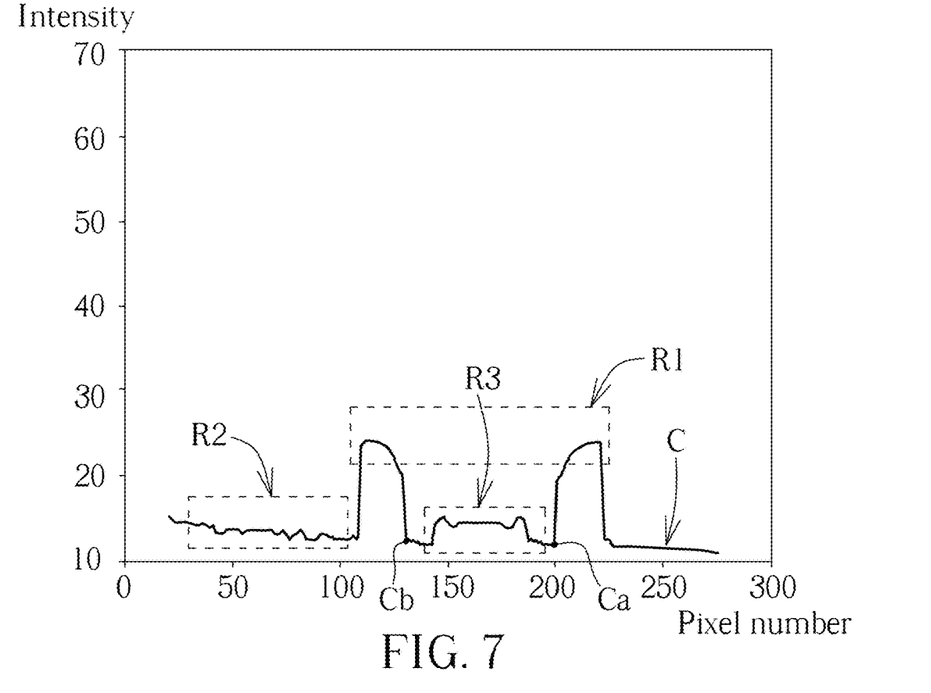
FIG. 7 is a diagram of a distribution curve transformed form the image according to the embodiment of the present invention.

Please refer to FIG. 5 to FIG. 7. FIG. 5 is an enlarged diagram of a part of the optical detection device 10 and the target container 12 according to the embodiment of the present invention. FIG. 6 is a diagram of an image I captured by the optical sensor array 16 according to the embodiment of the present invention. FIG. 7 is a diagram of a distribution curve C transformed form the image I according to the embodiment of the present invention. In one possible embodiment, when the optical sensor array 16 receives the long strip detection beam B, the optical detection device 10 can divide the long strip detection beam B into several segments B1~Bn, which are respectively projected onto a plurality of sections S1~Sn of the target container 12 (and/or the plane S). Each segment can be analyzed to compute the relative distance between each sensing unit 161 of the optical sensor array 16 and one corresponding section of the target container 12 (and/or the plane S); then, a plurality of the relative distance computed by the segments B1~Bn can be transformed into a contour of the target container 12 and the plane S.

As shown in FIG. 5, the target container 12 has an opening 121, and the liquid matter can be injected into the target container 12 via the opening 121. The opening 121 is surrounded by a rim 122 of the target container 12 and oriented to the optical sensor array 16, so that the optical sensor array 16 can capture the image I containing a pattern about inside and outside of the opening 121. When the linear light source 14 emits the long strip illumination beam, the rim 122 of the target container 12, the liquid matter inside the opening 121 of the target container 12, and the plane S whereon the target container 12 is located can reflect and generate the long strip detection beam B, which can be received by the optical sensor array 16. The optical detection device 10 can acquire the relative distance between the optical sensor array 16 and the rim 122 of the target container 12 and a liquid surface inside the opening 121, and the relative distance between the optical sensor array 16 and the plane S.

The long strip detection beam B can be divided into the plurality of segments B1~Bn, which are respectively reflected from the plurality of sections S1~Sn of the target container 12 and the plane S, and are respectively received by the plurality of sensing units 161 of the optical sensor array 16. The optical detection device 10 can analyze all intensity of the plurality of segments B1~Bn received by the sensing units 161, to acquire intensity variation of the long strip detection beam B. As shown in FIG. 7, the segment which has high intensity can represent a short relative distance between the optical sensor array 16 and the related section, such as a wave peak in the distribution curve C; the segment which has low intensity can represent a long relative distance between the optical sensor array 16 and the related section, such as a wave trough in the distribution curve C. Thus, distance variation of the optical sensor array 16 relative to the plurality of sections S1~Sn can be computed to draw the contour about those sections S1~Sn.

The distribution curve C can be classified according to the intensity computed value of all the plurality of segments B1~Bn. The said intensity computed value can be an intensity mean value or an intensity median value within one region of the distribution curve C, which depends on a design demand. For example, the distribution curve C can be divided into at least two regions, such as a first region R1 and a second region R2. The first region R1 can have a maximal intensity computed value, and can be represented as the rim 122 of the target container 12. The second region R2 can have a minimal intensity computed value, and can be represented as the plane S. The optical detection device 10 can compute a height of the target container 12 via height difference between the rim 122 and the plane S in response to analysis of the first region R1 and the second region R2.

In addition, the distribution curve C may be divided into three regions, such as the first region R1, the second region R2 and a third region R3. The third region R3 can have an intensity computed value ranged between the maximal intensity computed value and the minimal intensity computed value. The third region R3 can be located within the wave peaks of the first region R1, and can be represented as a base inside the target container 12. If the target container 12 is empty, the said base represents a bottle bottom of the target container 12; if the target container 12 has the liquid matter, the said base represents the liquid surface in the target container 12. The optical detection device 10 can analyze difference between the first region R1, the second region R2 and the third region R3, and utilize height difference between the rim 122 and the base of the target container 12 to determine a residual capacity of the target container 12 in a situation of the height of the target container 12 being known.

As shown in FIG. 7, the first region R1 of the distribution curve C contains two wave peaks, which can indicate two opposite sections of the rim 122 of the target container 12. Because a pixel number of the optical sensor array 16 is known, the size of the detection area on the plane S (for putting the target container 12) covered by the optical sensor array 16 can be known, so the optical detection device 10 can utilize a pixel number about an interval between the two wave peaks of the first region R1, and/or another pixel number about another interval between each wave peak and a corresponding boundary of the image I, to estimate the distance between the two opposite sections of the rim 122

(which means the distance between the two wave peaks), so as to acquire a diameter of the target container 12 (such as the size of the opening 121).

Besides, surface tension may be generated between the liquid matter and an inner wall of the target container 12, which results in the liquid matter within the place having optical parameters different from the optical parameters of the liquid matter within other place. The optical parameters may be a reflective index. The optical detection device 10 can analyze intensity difference between the sections S1~Sn relative to the long strip detection beam B, to find out the sections Sa and Sb with unusual optical parameters, and define the sections Sa and Sb as the base of the target container 12, such like a surface of the liquid matter. Then, corresponding points Ca and Cb relevant to the sections Sa and Sb can be checked on the distribution curve C, and the residual capacity of the target container 12 can be computed in accordance with height difference between the rim 122 and the base of the target container 12, or difference between height of the optical sensor array 16 relative to the plane S and height of the optical sensor array 16 relative to the base of the target container 12.

The optical detection device 10 further can store the optical parameters of the known liquid matter into the memory 18. The known liquid matter may be water, coffee or soda drinks. The optical parameters may be a group consisted of the reflective index, a refractive index and an absorption rate. If the coffee is injected into the target container 12, reflection intensity of the long strip detection beam B is high, so the optical detection device 10 can detect the correct height of the injected liquid matter in the target container 12. If the water is injected into the target container 12, the reflection intensity of the long strip detection beam B is low, and the height of the injected liquid matter in the target container 12 detected by the optical detection device 10 has noise; therefore, the optical detection device 10 can utilize the optical parameters pre-stored in the memory 18 to compensate an analysis result of the intensity distribution, so as to correctly compute the relative distance between the optical sensor array 16 and the liquid matter inside the target container 12, for acquiring the correct height of the injected liquid matter in the target container 12.

Figure 15:
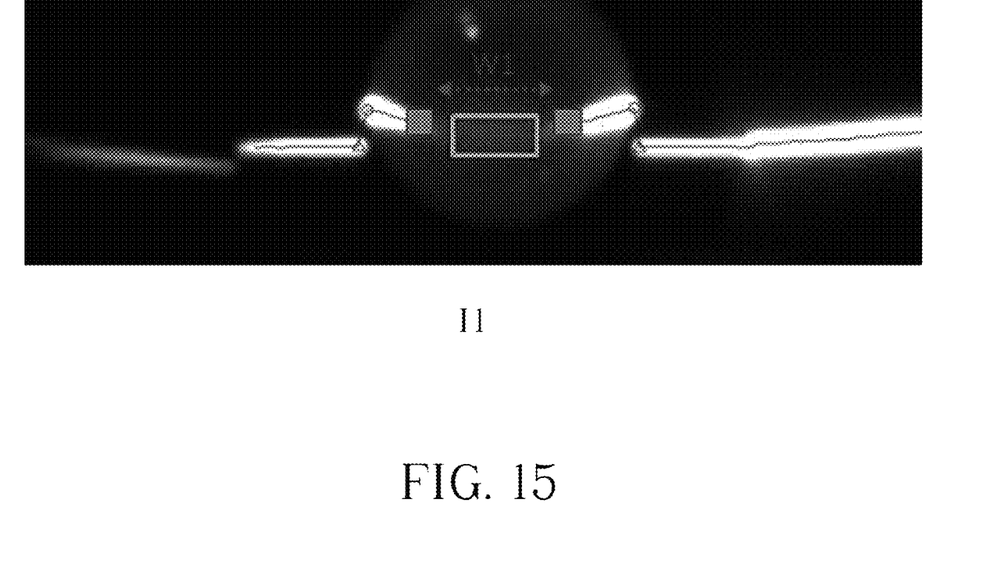
FIG. 15 and FIG. 16 are diagrams of images about different liquid matter captured by the optical sensor array according to the embodiment of the present invention.
Figure 16:
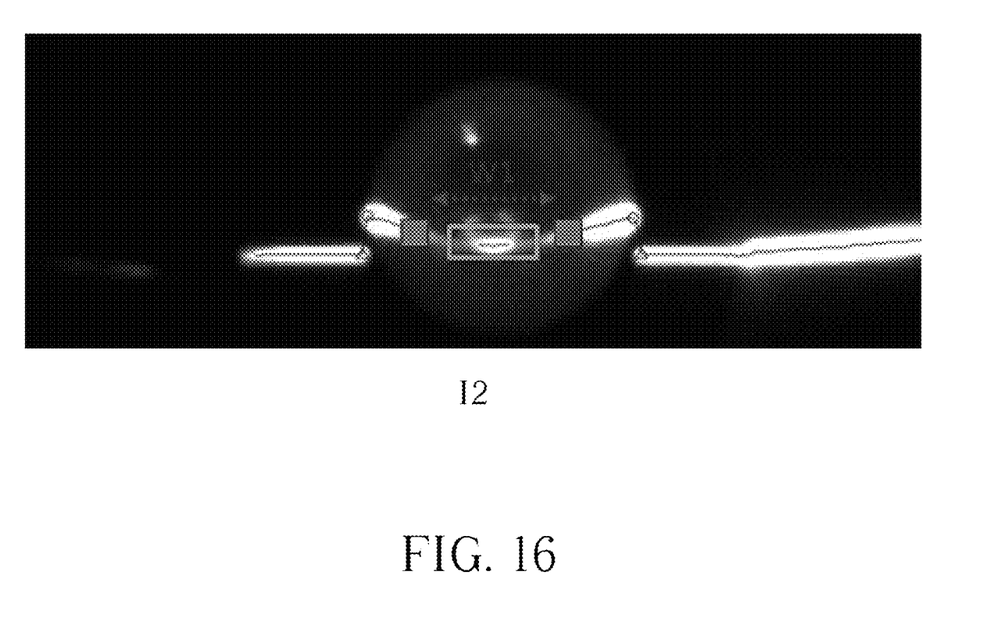

Further, the memory 18 may store geometric center information of the known liquid matter, and the optical detection device 10 can analyze the intensity distribution acquired by the optical sensor array 16 to identify a category of the liquid matter. Please refer to FIG. 15 and FIG. 16. FIG. 15 and FIG. 16 are diagrams of images I1 and I2 about different liquid matter captured by the optical sensor array 16 according to the embodiment of the present invention. As shown in FIG. 15, the image I1 shows the target container 12 accommodates the dark liquid matter, such as coffee, so that high intensity regions inside the opening 121 are adjacent to the rim 122. As shown in FIG. 16, the image I2 shows the target container 12 accommodates the transparent liquid matter, such as water, and high intensity regions inside the opening 121 are adjacent to the rim 122 and on center of the opening 121. Thus, the optical detection device 10 can analyze the geometric center information inside the images I1 and I2, and determine what value range of the optical parameters corresponds to the detected geometric center information according to stored information of the memory 18, so as to ensure a category of the liquid matter in the target container 12, such as coffee with the low reflective index or water with the high reflective index. The geometric center information may be a center of mass, a center of form, or a center of gravity, which depends on the actual demand.

Figure 17:
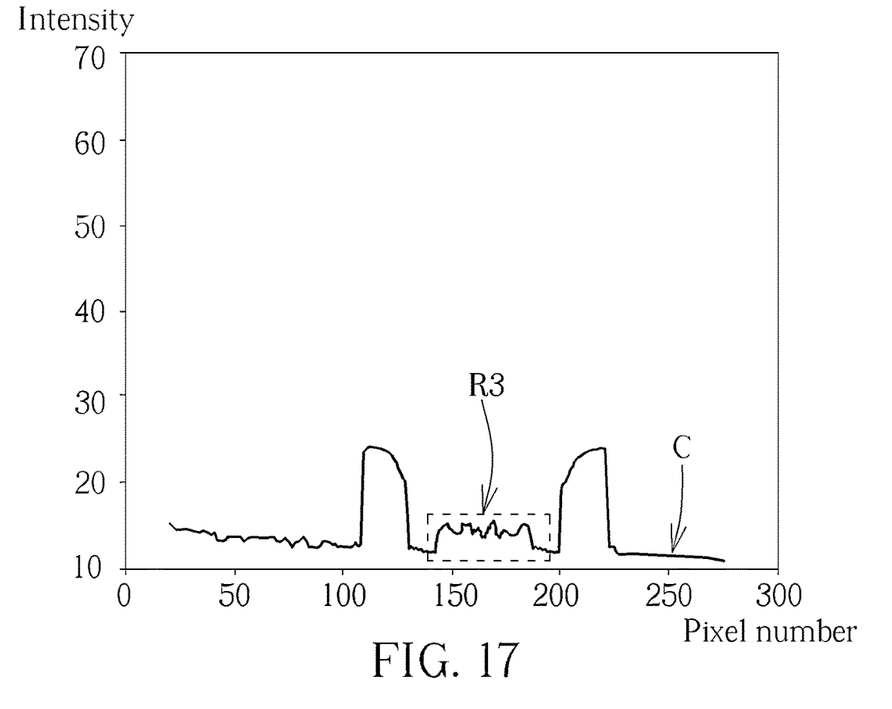
FIG. 17 is a diagram of the distribution curve transformed form the image according to another embodiment of the present invention.

Please refer to FIG. 7 and FIG. 17. FIG. 17 is a diagram of the distribution curve C' transformed form the image I' according to another embodiment of the present invention. As shown in FIG. 7, the third region R3 within the distribution curve C is smooth, which means the liquid matter inside the target container 12 has a flat top surface; as shown in FIG. 17, the third region R3 within the distribution curve C' is uneven, so that the target container 12 has something in the liquid matter. The optical detection device 10 can analyze the distribution curve C and C' to acquire the contour resulted from the intensity distribution of the sections S1~Sn, so as to show depth variation information inside the rim 122. If the depth variation information inside the rim 122 has small change, the target container 12 may accommodate the liquid matter; if the depth variation information inside the rim 122 has huge change, the target container 12 may accommodate the liquid matter and an extra object. The extra object can be a drifted thing, such as an ice cube or a sugar cube; or the extra object can be not the drifted thing, such as a spoon.

Figure 8:
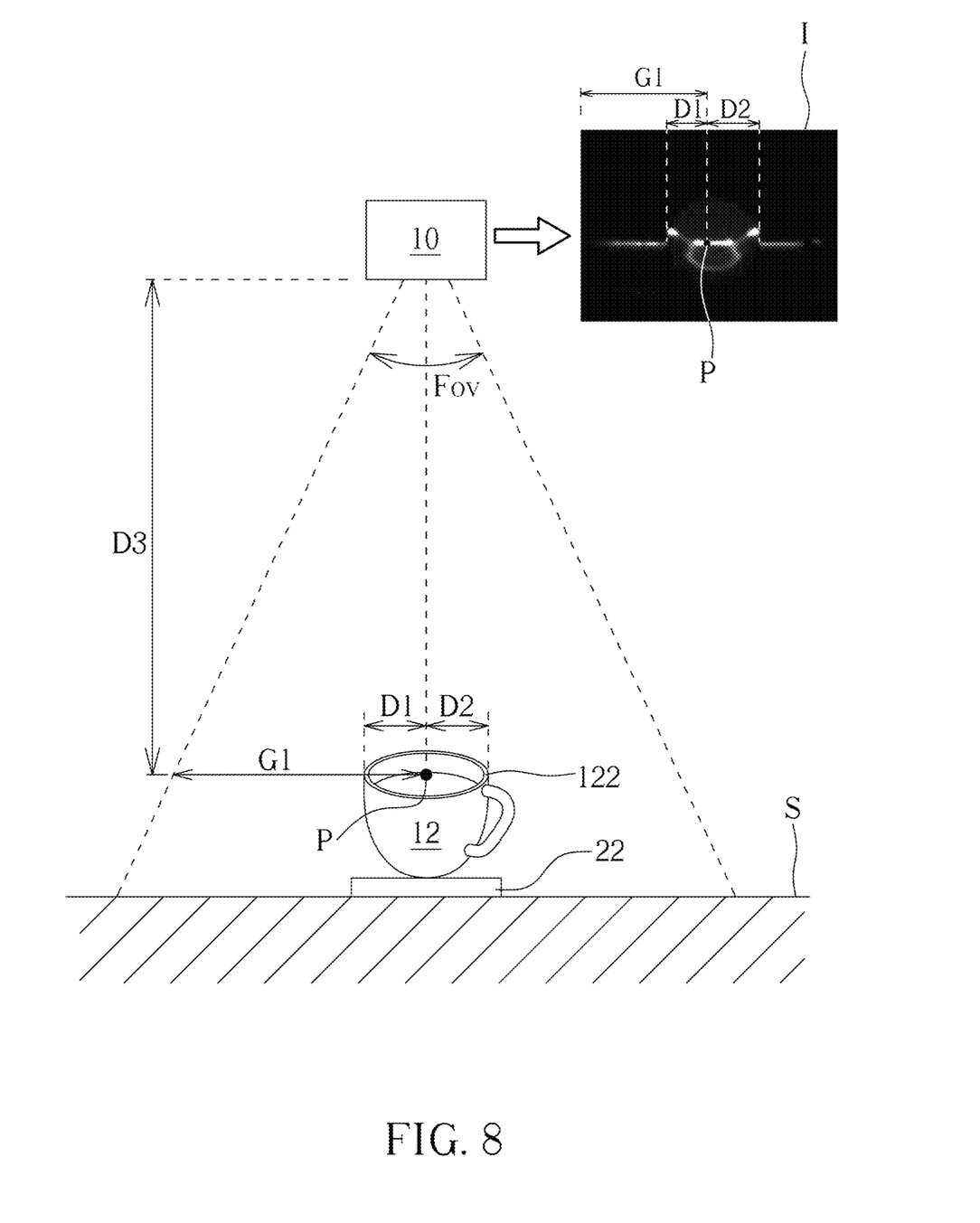
FIG. 8 is a diagram of the optical detection device and the target container in a detection mode according to another embodiment of the present invention.

Please refer to FIG. 6 and FIG. 8. FIG. 8 is a diagram of the optical detection device 10 and the target container 12 in a detection mode according to another embodiment of the present invention. In another possible embodiment, after receiving the image I, the optical detection device 10 may distinguish the rim 122 of the target container 12 from the plane S in the image I; for example, the first region R1 with the maximal intensity computed value can be represented as the rim 122, and the second region R2 with the minimal intensity computed value can be represented as the plane S. Then, the optical detection device 10 can define an alignment point P within a range around the rim 122, and the alignment point P can be a vertically projected point from the optical sensor array 16 onto a surface of the rim 122.

A field interval between the alignment point P and the left of the rim 122 can be defined as a first distance D1, and another field interval between the alignment point P and the right of the rim 122 can be defined as a second distance D2. If the optical detection device 10 does not point a center of the target container 12, the first distance D1 is different from the second distance D2. As the alignment point P is defined, the optical detection device 10 can acquire an angle value FOV about the field of view of the optical sensor array 16 from the memory 18, and compute a third distance D3 from the optical sensor array 16 to the alignment point P of the rim 122, and then utilize angle value FOV and the third distance D3 to compute a first gap G1 between the alignment point P and a left side of the field of view, or between the alignment point P and a right side of the field of view via trigonometric functions. The embodiment computes the first gap G1 between the alignment point P and the left side of the field of view, such as formula 1.

$$G1 = D3 \times \tan\left(\frac{FOV}{2}\right) \quad \text{Formula 1}$$

Then, the optical detection device 10 can acquire a first pixel number N1 of an interval from the alignment point P to the left of the rim 122 in the image I, and a second pixel number N2 of another interval from the alignment point P to the right of the rim 122 in the image I, and a third pixel number N3 of another interval from the alignment point P to the left side of the field of view. The optical detection device 10 can utilize the first gap G1, the first pixel number N1 and the third pixel number N3 to compute the first distance D1, such as formula 2, and further can utilize the first gap G1, the second pixel number N2 and the third pixel number N3 to compute the second distance D2, such as formula 3. The diameter of the opening 121 of the target container 12, which means the interval between the left side and the right side of the rim 122, can be a sum of the first distance D1 and the second distance D2.

$$D1 = G1 \times \frac{N1}{N3} \qquad \text{Formula 2}$$

$$D2 = G1 \times \frac{N2}{N3} \qquad \text{Formula 3}$$

When the existence of the target container 12 is detected and the height and the diameter of the target container 12 are computed, the optical detection device 10 may further utilize a pressure sensor 22 to detect a weight of the target container 12 and the injected liquid matter. The pressure sensor 22 can be disposed on the plane S and electrically connected to the processor 20. As the target container 12 is just put on the plane S, the liquid matter is not injected into the target container 12, and the pressure sensor 22 can detect and acquire an empty weight of the target container 12. As the liquid matter is injected into the target container 12, the pressure sensor 22 can detect and acquire an increased weight of the injected liquid matter. Because the optical detection device 10 can be installed on the known water dispenser or the known coffee maker, property parameters (such as density) of the liquid matter can be pre-stored in the memory 18. Thus, the optical detection device 10 can analyze the diameter Dt of the target container 12, the density Dw of the liquid matter, and the increased weight W1 of the injected liquid matter to compute the height Ell of the injected liquid matter in the target container 12, such as formula 4.

$$H1 = \frac{W1}{Dt \times Dw} \qquad \text{Formula 4}$$

Figure 9:
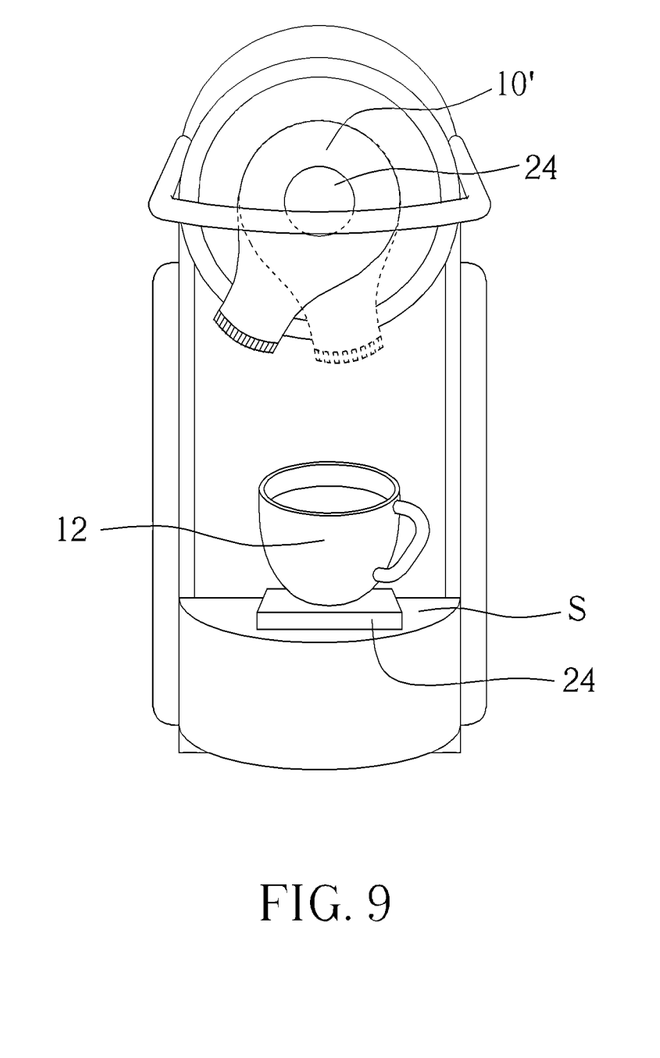
FIG. 9 and FIG. 10 are diagrams of the optical detection device according to other embodiments of the present invention.
Figure 10:
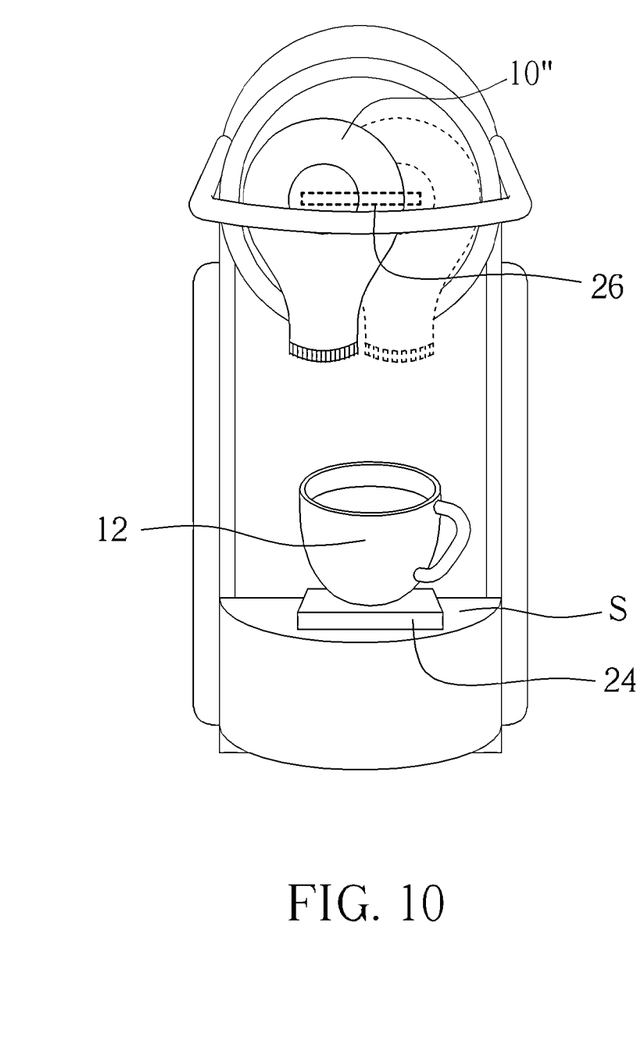

Please refer to FIG. 9 and FIG. 10. FIG. 9 and FIG. 10 are diagrams of the optical detection device 10' and 10" according to other embodiments of the present invention. In the embodiments, elements having the same numerals as ones of the foresaid embodiment have the same structures and functions, and a detailed description is omitted herein for simplicity. As the embodiment shown in FIG. 9, the optical detection device 10' can further include a rotation motor 24, and the rotation motor 24 can hold the linear light source 14 or a supporter of the target container 12. The rotation motor 24 can be disposed at least one of the linear light source 14 and the supporter of the target container 12. The supporter is an element disposed on the plane S for holding the target container 12 and not shown in the figures. The rotation motor 24 can rotate the linear light source 14 or the target container 12, so that the long strip illumination beam and the long strip detection beam can fully scan all aspects of the target container 12. As the embodiment shown in FIG. 10, the optical detection device 10" can further include a shifting motor 26 used to hold at least one of the linear light source 14 and the supporter of the target container 12, so as to shift the linear light source 14 or the target container 12 for fully scanning the target container 12.

Figure 11:
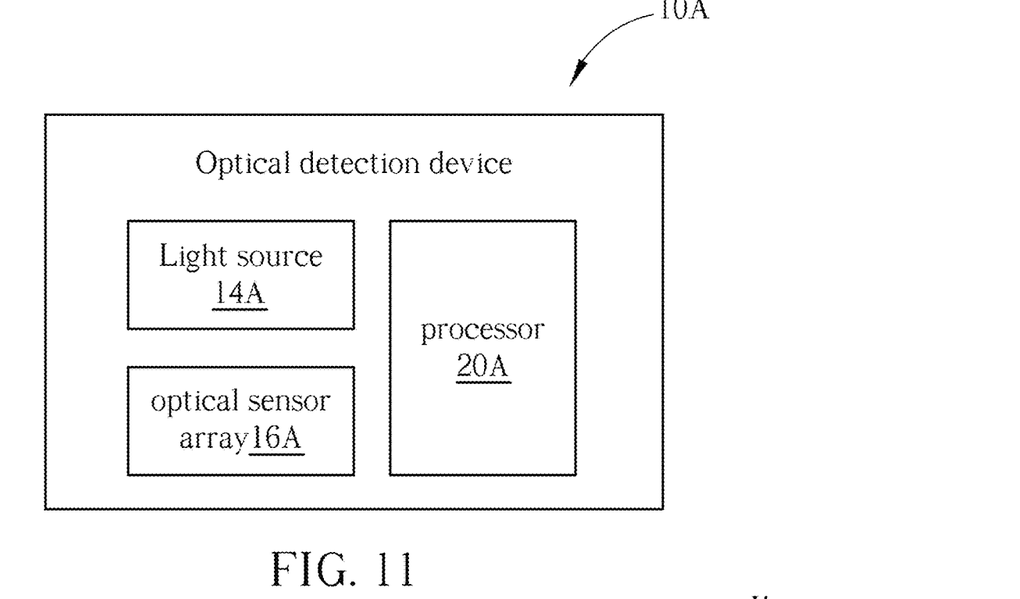
FIG. 11 is a functional block diagram of an optical detection device according to another embodiment of the present invention.
Figure 12:
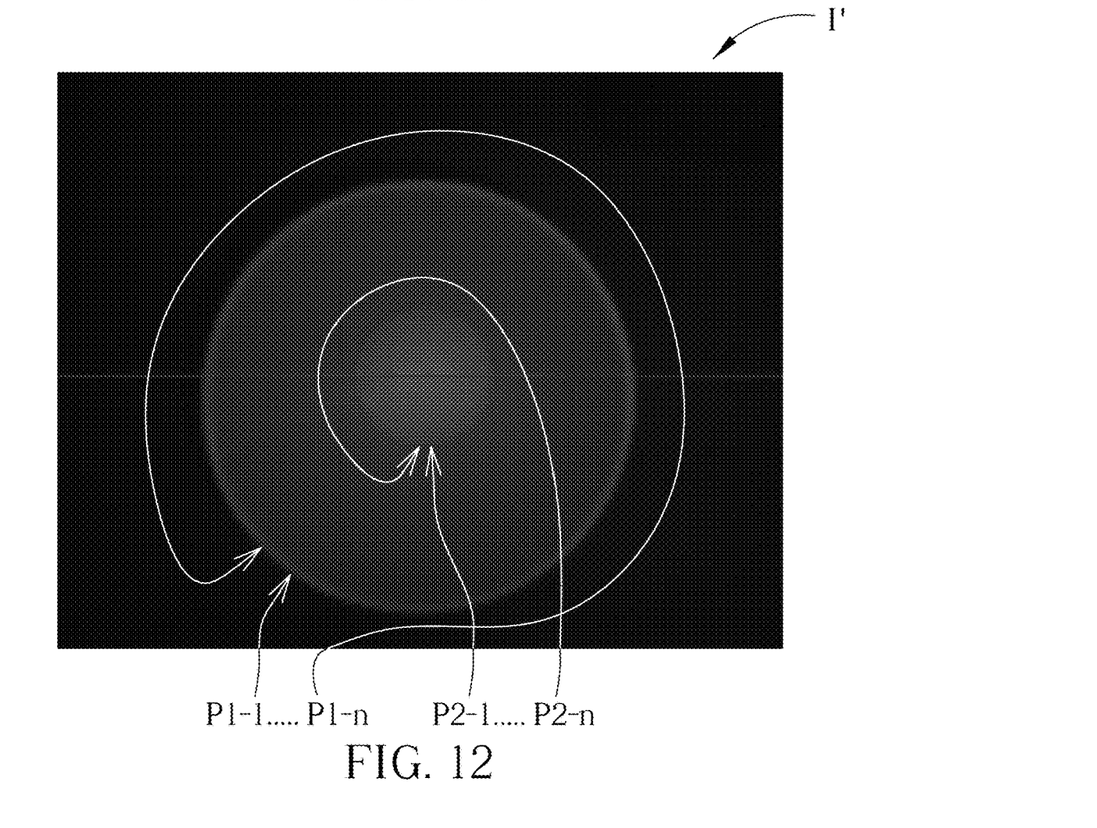
FIG. 12 is a diagram of an image captured by the optical detection device according to the foresaid embodiment of the present invention.
Figure 13:
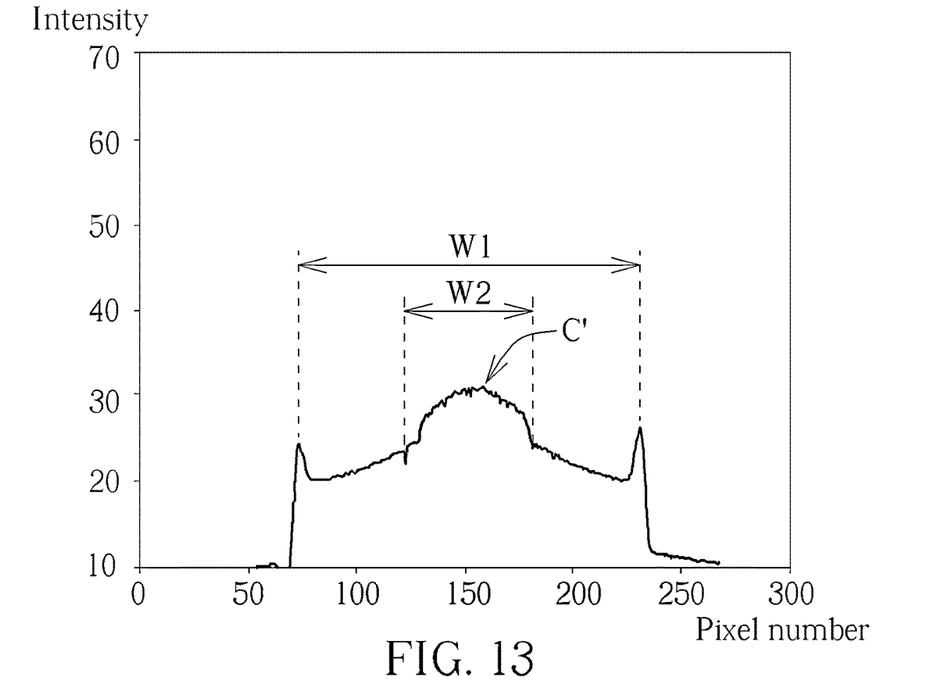
FIG. 13 is a diagram of a distribution curve transformed form the image according to the foresaid embodiment of the present invention.
Figure 14:
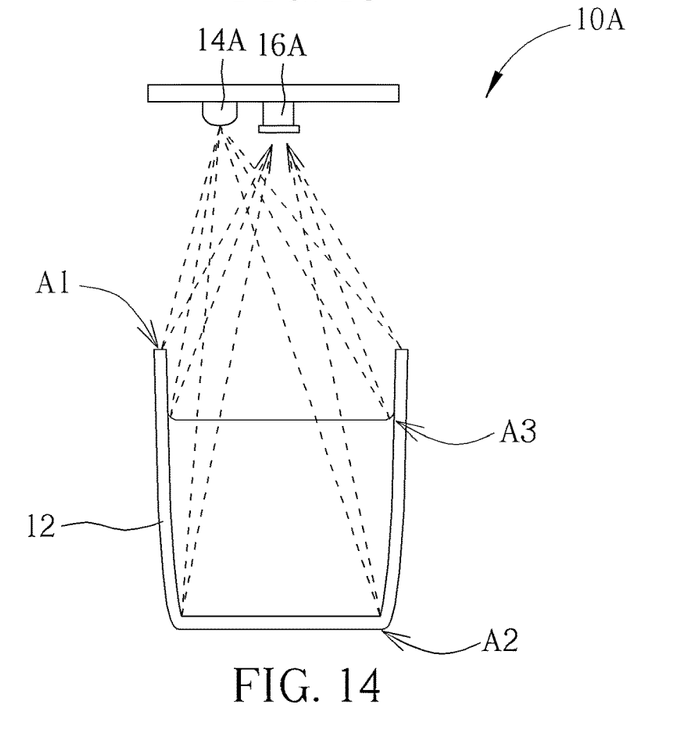
FIG. 14 is a diagram of the optical detection device and the target container according to the foresaid embodiment of the present invention.

Please refer to FIG. 11 to FIG. 14. FIG. 11 is a functional block diagram of an optical detection device 10A according to another embodiment of the present invention. FIG. 12 is a diagram of an image I' captured by the optical detection device 10A according to the foresaid embodiment of the present invention. FIG. 13 is a diagram of a distribution curve C' transformed form the image I' according to the foresaid embodiment of the present invention. FIG. 14 is a diagram of the optical detection device 10A and the target container 12 according to the foresaid embodiment of the present invention. The optical detection device 10A can detect the dimensions of the target container 12. The optical detection device 10A can include a light source 14A, an optical sensor array 16A and a processor 20A. The optical detection device 10A may optionally include a memory module, which has a function the same as ones of the above-mentioned embodiment, and a detailed description can be omitted herein for simplicity.

The light source 14A may be the linear light source adapted to project the long strip illumination beam onto the target container 12, or be a spot light source adapted to project a dispersed illumination beam onto the target container 12. The optical sensor array 16A can receive the detection beam reflected from the target container 12. A type of the detection beam can correspond to a type of the illumination beam projected by the light source 14A.

The processor 20A can be electrically connected to the optical sensor array 16A. The processor 20A can analyze intensity distribution of the detection beam to find out at least two regions with specific intensity, and then compute a radial dimension of the target container 12 according to an interval between the specific intensity regions. For example, if the light source 14A is the spot light source and the target container 12 is a round shape cup, the image I' captured by the optical detection device 10A can contain a round shape pattern. Because an interval between the optical detection device 10A and the cup rim A1 of the target container 12 is short, and a plurality of reflection points P1-1~P1-n with specific intensity (which means the foresaid specific intensity regions) which is arranged as the round shape can be generated via scattering function when the detection beam generated by the optical detection device 10A is projected into the cup rim A1 of the target container 12. The processor 20A can analyze relative position of the reflection points P1-1~P1-n to acquire a width W1 (which means the radial dimension) of the target container 12.

If the light source 14A is the linear light source and the target container 12 is the round shape cup, the distribution curve transformed from the image, which is captured by the optical detection device 10A, can have at least two reflection points (which are not shown in the figures) with the specific intensity due to the detection beam being scattered on a left side and a right side of the cup rim A1 of the target container 12. The processor 20A can analyze an interval between the two reflection points to acquire the width W1 (which means the radial dimension) of the target container 12.

As shown in FIG. 12 to FIG. 14, the image I' can have the outer round shape pattern with large radial dimensions and the inner shape pattern with small radial dimensions. The outer round shape pattern can be made by the plurality of reflection points P1-1~P1-n with first intensity, and can represent the width W1 of the target container 12 in a first height, such as position of the cup rim A1. The smaller inner shape pattern can be made by a plurality of reflection points P2-1~P2-n with second intensity. If the target container 12 does not contain the liquid matter, the detection beam of the light source 14A can be scattered by the cup bottom A2 of the target container 12 to generate the reflection points P2-1~P2-n; if the target container 12 contains the liquid matter, the detection beam of the light source 14A can be scattered by the liquid surface A3 inside the target container 12 to generate the reflection points P2-1~P2-n. The processor 20A can analyze relative position of the reflection points P2-1~P2-n to acquire the width W2 of the cup bottom A2 or the liquid surface A3 of the target container 12.

The reflection points P2-1~P2-n can represent the width W2 of the target container 12 in a second height (such as position of the cup bottom A2 or the liquid surface A3). An interval between the optical detection device 10A and the cup bottom A2 (or the liquid surface A3) is longer than the interval between the optical detection device 10A and the cup rim A1 of the target container 12, so that the second intensity of the reflection points P2-1~P2-n can be greater than reflection intensity of a cup wall of the target container 12, and smaller than the first intensity of the reflection points P1-1~P1-n around the cup rim A1. Thus, the processor 20A can analyze the outer round shape pattern and the inner shape pattern within the image I' and/or the corresponding distribution curve C', to rapidly identify the position and width of the cup rim A1, the cup bottom A2 and the liquid surface A3 of the target container 12.

Figure 18:
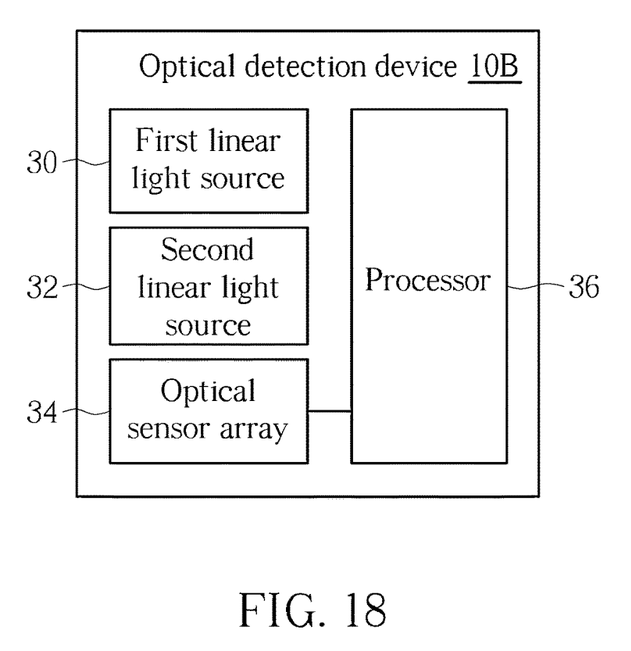
FIG. 18 is a functional block diagram of an optical detection device according to another embodiment of the present invention.
Figure 19:
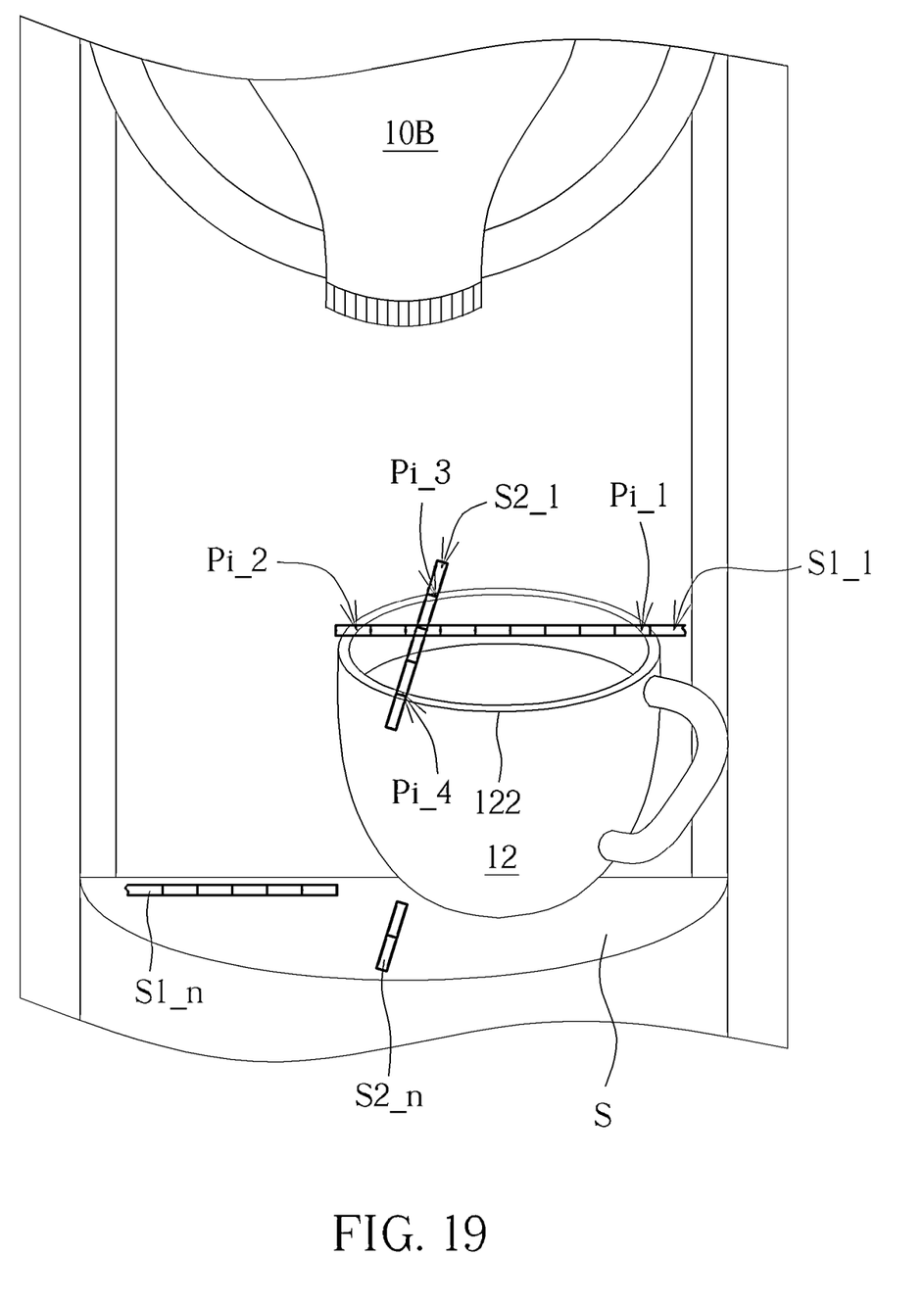
FIG. 19 and FIG. 20 are diagrams of the target container detected by the optical detection device according to another embodiment of the present invention.
Figure 20:
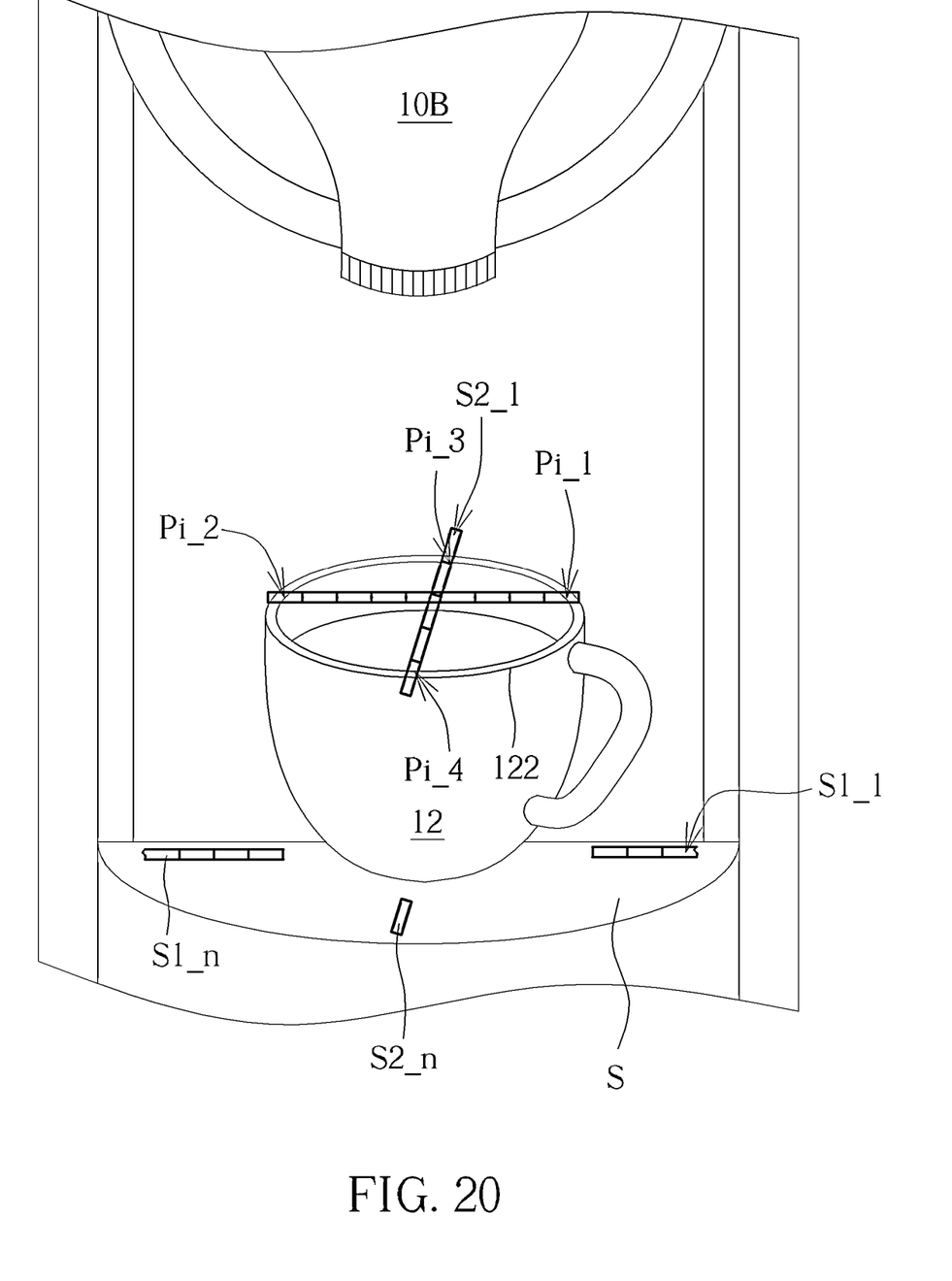

Please refer to FIG. 18 to FIG. 20. FIG. 18 is a functional block diagram of an optical detection device 10B according to another embodiment of the present invention. FIG. 19 and FIG. 20 are diagrams of the target container 12 detected by the optical detection device 10B according to another embodiment of the present invention. The optical detection device 10B can include a first linear light source 30, a second linear light source 32, an optical sensor array 34 and a processor 36. The first linear light source 30 and the second linear light source 32 can project a first long strip illumination beam and a second long strip illumination beam respectively onto the target container 12, and a first long strip detection beam and a second long strip detection beam can be reflected from the target container 12 and the plane S for being received by the optical sensor array 34. Each segment of the first long strip detection beam are respectively reflected from a plurality of sections S1-1~S1 n of the target container 12 and/or the plane S. Each segment of the second long strip detection beam are respectively reflected from a plurality of sections S2_1~S2 n of the target container 12 and/or the plane S.

The optical sensor array 34 can be the M×N matrix, and M and N are positive integer numerals; the actual application of the matrix is not limited to the foresaid embodiment. The processor 36 can be electrically connected to the optical sensor array 34. The processor 36 can analyze the intensity distribution of the first long strip detection beam and the second long strip detection beam from the target container 12 and/or the plane S, to acquire the relative distance between the optical sensor array 34 and the target container 12. Two intersection points Pi_1 and Pi_2 can be formed by the first long strip detection beam and the rim 122 of the target container 12. Two intersection points Pi_3 and Pi_4 can be formed by the second long strip detection beam and the rim 122 of the target container 12. The processor 36 can compute an interval between the intersection points Pi_1 and Pi_2 and an interval between the intersection points Pi_3 and Pi_4, so as to accordingly determine the relative distance between the optical sensor array 34 and the target container 12.

As shown in FIG. 19, the interval between the intersection points Pi_1 and Pi_2 is greater than the interval between the intersection points Pi_3 and Pi_4, and the intersection points Pi_3 and Pi_4 are much close to the intersection point Pi_2 instead of the intersection point Pi 1, so that the target container 12 can be determined as not correctly locating under the optical sensor array 34. As shown in FIG. 20, the interval between the intersection points Pi_1 and Pi_2 is the same as or similar to the interval between the intersection points Pi_3 and Pi_4, and the intersection points Pi_3 and Pi_4 are in middle between the intersection points Pi_1 and Pi_2, so the target container 12 can be determined as correctly locating under the optical sensor array 34. The optical detection device 10B can output a corresponding reminder message according to the foresaid determination result, such as reminder of adjusting position of the target container 12, and the water dispenser or the coffee maker can inject the liquid matter into the target container 12 without leakage.

The optical detection device of the present invention can utilize the image about the target container and the plane illuminated by the linear light source or the spot light source to determine the height and the diameter of the target container. If the optical parameters (such as the reflective index, the refractive index and the absorption rate) of the liquid matter in the target container are known, the optical parameters can be utilized to compensate and compute the correct height of the injected liquid matter in the target container. Moreover, the optical detection device may utilize the pressure sensor to detect the increased weight of the injected liquid matter in the target container, and then utilize pixel numbers of the optical sensor array and the height of the optical sensor array relative to the rim of the target container to acquire the diameter of the target container, so as to compute the height of the injected liquid matter in the target container via analysis of the increased weight and the density of the injected liquid matter and the diameter of the target container.

In conclusion, the optical sensor array and the pressure sensor of the optical detection device can be simultaneously applied for detection of the liquid matter. If the optical detection device detects the raised height of the injected liquid matter and the increased weight of the target container, the injected liquid matter may be dark or opaque as coffee, so the optical sensor array can be actuated to detect the correct height of the injected liquid matter. If the optical detection device detects the increased weight of the target container, but does not detect the raised height of the injected liquid matter or detects slow rise or nonlinear rise of the height of the injected liquid matter, the injected liquid matter may be light or transparent as water, and the pressure sensor can be actuated for helping the optical sensor array to acquire the correct height of the injected liquid matter. Comparing to the prior art, the optical detection device of the present invention can be installed on the water dispenser or the coffee maker, and can rapidly and correctly compute the height of the injected liquid matter in the target container, so as to effectively estimate discharge capacity of the water dispenser and the coffee maker, and to prevent the injected liquid matter from leakage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detection device of detecting a target container, the optical detection device comprising:
   a first linear light source adapted to project a first long strip illumination beam onto the target container;

a second linear light source adapted to project a second long strip illumination beam onto the target container, the second long strip illumination beam being crossed with the first long strip illumination beam;

an optical sensor array adapted to receive a first long strip detection beam and a second long strip detection beam reflected from the target container; and a processor electrically connected to the optical sensor array, the processor being adapted to analyze intensity distribution of the first long strip detection beam and the second long strip detection beam to acquire a relative distance between the optical sensor array and the target container.

2. The optical detection device of claim 1, wherein the processor computes distances between intersection points of the first long strip detection beam and the second long strip detection beam and a rim of the target container, so as to acquire the relative distance.

3. The optical detection device of claim 1, wherein the processor outputs a corresponding reminder message according to the relative distance.

* * * * *